(12) United States Patent
Cheng et al.

(10) Patent No.: US 11,940,690 B2
(45) Date of Patent: Mar. 26, 2024

(54) DISPLAY PANEL AND DISPLAY DEVICE

(71) Applicant: WUHAN CHINA STAR OPTOELECTRONICS TECHNOLOGY CO., LTD., Hubei (CN)

(72) Inventors: Wei Cheng, Hubei (CN); Rui He, Hubei (CN); Xindong Mei, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 78 days.

(21) Appl. No.: 17/623,898

(22) PCT Filed: Dec. 15, 2021

(86) PCT No.: PCT/CN2021/138444
§ 371 (c)(1),
(2) Date: Dec. 30, 2021

(87) PCT Pub. No.: WO2023/102981
PCT Pub. Date: Jun. 15, 2023

(65) Prior Publication Data
US 2023/0185124 A1     Jun. 15, 2023

(30) Foreign Application Priority Data
Dec. 10, 2021   (CN) .......................... 20111506401.0

(51) Int. Cl.
G02F 1/1335    (2006.01)
G02F 1/1337    (2006.01)
G02F 1/1343    (2006.01)

(52) U.S. Cl.
CPC ...... *G02F 1/133531* (2021.01); *G02F 1/1337* (2013.01); *G02F 1/134309* (2013.01)

(58) Field of Classification Search
None
See application file for complete search history.

(56) References Cited

U.S. PATENT DOCUMENTS 8,988,643 B2 *  3/2015  Yang ................ G02F 1/134309
                                                    349/141
2017/0123241 A1 *  5/2017  Su ..................... G02F 1/134363
(Continued)

FOREIGN PATENT DOCUMENTS

CN    103091883 A    5/2013
CN    105372883 A    3/2016
(Continued)

OTHER PUBLICATIONS

International Search Report in International application No. PCT/CN2021/138444, dated Aug. 26, 2022.
(Continued)

*Primary Examiner* — Ryan Crockett
(74) *Attorney, Agent, or Firm* — Rivka Friedman

(57) ABSTRACT

A display panel and a display device are provided. The display panel includes a first substrate, a second substrate, and a liquid crystal layer between the first substrate and the second substrate. The liquid crystal layer comprises a plurality of liquid crystal molecules. When the display panel is in a first display mode, the plurality of liquid crystal molecules rotate in a slanted plane parallel to a first direction and a second direction. The first direction is slanted with respect to a thickness direction of the display panel, and the second direction is perpendicular to the thickness direction of the display panel and the first direction.

18 Claims, 3 Drawing Sheets

(56) References Cited

U.S. PATENT DOCUMENTS

2018/0052342 A1    2/2018  Chang
2021/0240021 A1    8/2021  Hsieh
2021/0325737 A1*  10/2021  Zhang ................. G02F 1/13706

FOREIGN PATENT DOCUMENTS

| CN | 107422409 A  | 12/2017 |
| CN | 109239996 A  | 1/2019  |
| CN | 109709730 A  | 5/2019  |
| CN | 110032009 A  | 7/2019  |
| CN | 110133882 A  | 8/2019  |
| CN | 110780477 A  | 2/2020  |
| CN | 211554556 U  | 9/2020  |
| CN | 113552741 A  | 10/2021 |
| CN | 113625373 A  | 11/2021 |

OTHER PUBLICATIONS

Written Opinion of the International Search Authority in International application No. PCT/CN2021/138444, dated Aug. 26, 2022.
Chinese Office Action issued in corresponding Chinese Patent Application No. 202111506401.0 dated Jan. 5, 2023, pp. 1-7.

\* cited by examiner

DISPLAY PANEL AND DISPLAY DEVICE

FIELD OF THE DISCLOSURE

The present disclosure relates to display technology, and more particularly, to a display panel and a display device.

BACKGROUND

With the advancement of technology and the iteration of consumer electronics, consumers pay more and more attention to privacy protection. In some occasions, users of a display device don't want a third person to see images on the display screen. This requires the display device with an anti-peep function to prevent other people within the display range from reaching the picture content. The display with the privacy function provides the target users with the content readability from the protective visible viewing angle and reduces the content visibility deviated from the front viewing angle to achieve anti-peep. The display with the privacy function of the related art adopts a technique of covering an anti-peep film layer on the display device or additionally providing the display screen with one or more dimming devices. However, the anti-peep technique in the related art is usually two-way or four-way anti-peep, and additional one or more dimming devices increase the thickness of the display device. Actually, a vehicle display needs unidirectional anti-peep but anti-peep technology in the related art fails to meet the needs of the vehicle display on anti-peep.

Therefore, it is necessary to propose a technical solution to equip the vehicle device with a function of unidirectional anti-peep.

SUMMARY

An object of the present disclosure is to propose a display panel and a display device performing the function of realizing unidirectional anti-peep in a first display mode and the display device is obviously thinned in thickness.

According an embodiment of the present disclosure, a display panel includes a first substrate, a second substrate disposed opposite to the first substrate, a first polarizer, a second polarizer, and a liquid crystal layer. The liquid crystal layer is disposed between the first substrate and the second substrate. The liquid crystal layer includes a plurality of liquid crystal molecules. The first polarizer is disposed at a side of the first substrate away from the second substrate. The second polarizer is disposed at a side of the second substrate away from the first substrate. The light-transmitting axis of the first polarizer is perpendicular to the light-transmitting axis of the second polarizer. When the display panel is in a first display mode, the plurality of liquid crystal molecules rotate in a slanted plane parallel to a first direction and a second direction. The first direction is slanted with respect to a thickness direction of the display panel, and the second direction is perpendicular to the thickness direction of the display panel and the first direction.

A display device includes a backlight module and the above display panel.

A display panel having a first side and a second side. The first side and the second side are disposed opposite. The display panel includes a first substrate, a second substrate, disposed opposite to the first substrate, a first alignment layer, a second alignment layer, a liquid crystal layer, a first polarizer, and a second polarizer. The first alignment layer is disposed on a surface of the first substrate near the second substrate. The second alignment layer is disposed on a surface of the second substrate away from the first substrate. The liquid crystal layer is disposed between the first alignment layer and the second alignment layer. The liquid crystal layer includes a plurality of liquid crystal molecules. The first polarizer is disposed at a side of the first substrate away from the second substrate. The second polarizer is disposed at a side of the second substrate away from the first substrate. The light-transmitting axis of the second polarizer is perpendicular to the light-transmitting axis of the first polarizer. When the display panel is in a non-operating state, the first alignment layer and the second alignment layer are configured to slant a long axis of the plurality of the liquid crystal molecules toward the first side. When the display panel is in first display mode, the long axis of the plurality of the liquid crystal molecules slanting toward the first side, and a visible viewing angle of the first side of the display panel is smaller than a visible viewing angle of the second side of the display panel.

The present disclosure proposes a display panel and a display device. When the display panel is in a first display mode, a plurality of liquid crystal molecules rotate in a slanted plane. The slanted plane is parallel to a first direction and a second direction, and the first direction is slanted with respect to the thickness direction of the display panel. The second direction is perpendicular to the first direction and the thickness direction of the display panel, and the light propagating in the first direction only passes the long axis of the liquid crystal molecules. The light propagating a polarization direction is still the same as the light propagating the light-transmitting axis of the first polarizer after passing the liquid crystal layer, which causes the light propagating in the first direction to fail to pass the liquid crystal layer after being blocked by the second polarizer. A specific angle is formed between the polarization direction of the light deviating from the first direction and the long axes of the liquid crystal molecules, which causes phase delay to occur after the light passes the liquid crystal layer in the polarization direction. The polarization direction of the light for phase delay is different from the polarization direction of the light-transmitting axis of the first polarizer, and a part or more of the light for phase delay penetrates the second polarizer. In this way, the display panel performs the function of realizing anti-peep in the first direction. Besides, a single display panel utilized for the display device reduces the overall thickness of the display device.

BRIEF DESCRIPTION OF THE DRAWINGS

These and other features of the present invention will become apparent from the following description of some embodiments, given as a non-restrictive example with reference to the attached drawings wherein.

DETAILED DESCRIPTION OF THE EMBODIMENTS

Figure 1:
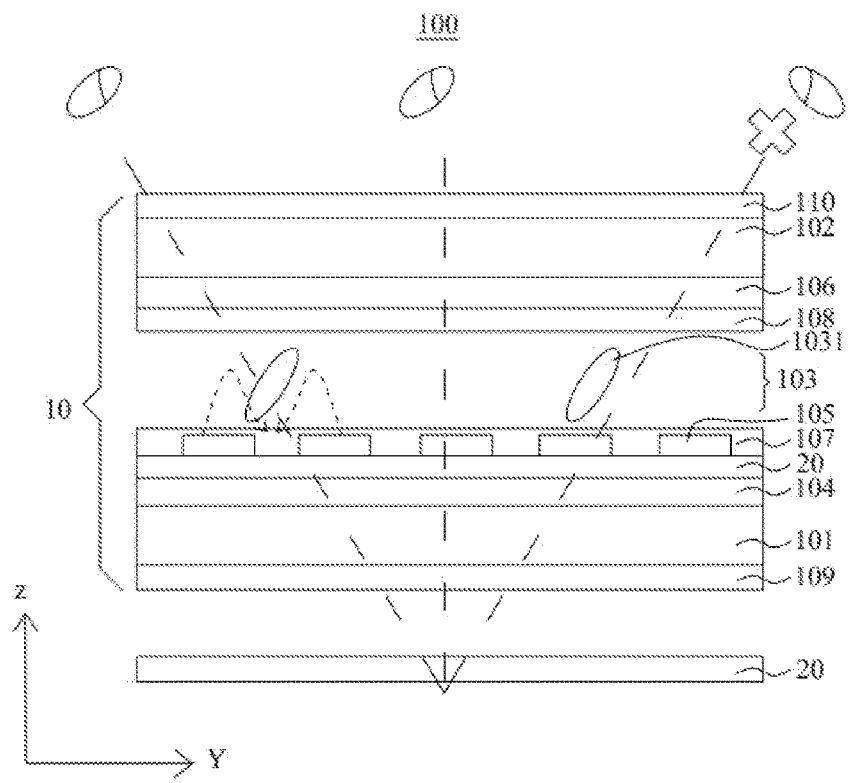
FIG. 1 is a cross-sectional view showing a display device when the display panel is in the first display mode in the present embodiment.

The above and other aspects and features of the present invention will be described more fully hereinafter with reference to the accompanying drawings, in which example embodiments of the present inventions are shown. While some example embodiments of the present invention have been described using specific terms, such description is for illustrative purposes, and it is to be understood that changes and variances may be made without departing from the spirit or scope of the following claims. Further, it should be understood that parts, which are not essential to a complete understanding of the present invention, may be omitted in the drawings for clarity of description Like reference numerals are used to identify like elements throughout different drawings.

With reference to FIG. 1, FIG. 2, FIG. 3, and FIG. 4, a vehicle display device 100 is proposed by a preferred embodiment of the present disclosure. The display device 100 includes a display panel 10 and a backlight module 20. The backlight module 20 is arranged at an incident light side of the display panel 10. The display device 100 has an anti-peep mode and a sharing mode. The visible viewing angle of the anti-peep mode is less than the visible viewing angle of the sharing mode. The display panel 10 includes a first polarizer 109, a first substrate 101, a second substrate 102, a liquid crystal layer 103, a second polarizer 110, a first electrode layer 104, a first alignment layer 107, and a second alignment layer 108, a plurality of second electrodes 105, and a third electrode layer 106. The plurality of second electrodes 105 are arranged at intervals. The backlight module 20 is configured to provide the display panel 10 with a backlight. The backlight module 20 may be a quasi-backlight module or a non-quasi-backlight module.

The first substrate 101 is arranged opposite to the second substrate 102. The liquid crystal layer 103 is disposed between the first substrate 101 and the second substrate 102. The liquid crystal layer 103 includes a plurality of liquid crystal molecules 1031. Both of the first substrate 101 and the second substrate 102 are glass substrates or any kind of flexible substrate.

The first polarizer 109 is attached to the first substrate 101 and is disposed on one side of the first substrate 101 away from the second substrate 102. The first polarizer 109 is arranged close to the backlight module 20. The second polarizer 110 is attached to the second substrate 102 and is disposed on the second substrate 102 away from the first substrate 101. The light-transmitting axis of the first polarizer 109 is perpendicular to the light-transmitting axis of the second polarizer 110.

The first alignment layer 107 is disposed on the surface of the first substrate 101 close to the second substrate 102. The second alignment layer 108 is disposed on the surface of the second substrate 102 close to the first substrate 101. The liquid crystal layer 103 is arranged between the first alignment layer 107 and the second alignment layer 108. After the plurality of liquid crystal molecules 1031 are aligned, the initial state of the first alignment layer 107 and the second alignment layer 108 is that the long axis of the plurality of liquid crystal molecules 1031 are disposed in a first direction W. The first direction W is slanted with respect to the thickness direction of the display panel 10, and the thickness direction of the display panel 10 is defined as a Z direction. At this time, a pretilt angle of the plurality of liquid crystal molecules 1031 on the first alignment layer 107 and the second alignment layer 108 is equal to an angle between the first direction W and the horizontal direction (perpendicular to the thickness direction of the display panel). The first alignment layer 107 and the second alignment layer 108 may be formed by light alignment or frictional alignment.

When the display panel is in a non-operating state, the long axis of the plurality of liquid crystal molecules 1031 is in the first direction W owing to the performance of the first alignment layer 107 and the second alignment layer 108.

The first electrode layer 104 is totally disposed on one surface of the first substrate 101 near the second substrate 102. The first electrode layer 104 is a common electrode. Voltage applied to the first electrode layer 104 is a constant voltage when the display panel 10 is on display. The plurality of second electrodes 105, which are arranged at intervals, are pixel electrodes. The plurality of second electrodes 105 are disposed on the first substrate 101 and arranged in a second direction Y. Voltage applied to the plurality of second electrodes 105 is the data voltage on corresponding display. Each of the plurality of second electrodes 105 is a bar electrode. The length direction of the second electrode 105 is defined as the X direction. The second direction Y, the thickness direction (i.e., the Z direction) of the display panel, and the X direction are perpendicular to one another. The second direction Y is perpendicular to the first direction W. The first direction W is slanted with respect to the X direction and the angle between the first direction W and the X direction is an acute angle (90 degrees). The entire third electrode layer 106 is disposed on one surface of the second substrate 102 close to the first substrate 101. The third electrode layer 106 may include a plurality of block electrodes or a plurality of bar electrodes arranged at intervals as well. Especially, material for producing the first electrode layer 104, the plurality of second electrodes 105, and the third electrode layer 106 are all transparent conductive material such as indium tin oxide, indium zinc oxide, or more than indium tin oxide and indium zinc oxide.

The first electrode layer 104 is disposed between the plurality of second electrodes 105 and the first substrate 101 in the thickness direction (i.e., the Z direction) of the display panel 10. The first alignment layer 107 is disposed on one surface of the plurality of second electrodes 105 away from the first substrate 101. The third electrode layer 106 is disposed between the second alignment layer 108 and the second substrate 102. The plurality of second electrodes 105 may be disposed between the first electrode layer 104 and the first substrate 101 as well.

When the display device 100 is in the anti-peep mode, the display panel 10 is in the first display mode. Voltage applied to the third electrode layer 106 is less than or equal to the predetermined threshold voltage. Voltage applied to the first electrode layer 104 is the constant voltage. Voltage applied to the second electrode 105 is the data voltage for displaying. The vertical electric field formed by the voltage applied to the third electrode layer 106 and the constant voltage applied to the first electrode layer 104, and the data voltage applied to the plurality of second electrodes 105 is small and not enough to drive a plurality of liquid crystal molecules 1031 to rotate. The plurality of aligned liquid crystal molecules 1031 disposed in the first direction W are mainly controlled by a curved electric field formed by the plurality of second electrodes 105 and the first electrode layer 104. Since the plurality of second electrodes 105 are disposed in the second direction Y, the curved electric field formed by the plurality of second electrodes 105 and the first electrode layer 104 carries weight only in the second direction Y and the Z direction except the second direction X. The plurality of liquid crystal molecules 1031 are rotated in the slanted plane S to display different grayscale, and the slanted plane S is parallel to the first direction W and the second direction Y. At the same time, the propagation direction of a first light L1 emitting into the display panel 10 is in the first direction W. The polarization direction of the first light L1 is only the long axis passing the plurality of liquid crystal molecules 1031. Therefore, phase delay does not occur after the polarization direction of the first light L1 passes the liquid crystal layer 103, and the polarization direction of the first light L1 is still parallel to the light-transmitting axis of the first polarizer 109. Since the light-transmitting axis of the second polarizer 110 is perpendicular to the light-transmitting axis of the first polarizer 109. The first light L1 intercepts the second polarizer 110, causing the brightness of the display device 100 in the first direction W to become very dark and the visibility of images on the display screen in the first direction W to become low so as to realize anti-peep of the display device 100 in the first direction W. The propagation direction of the second light L2 emitting into the display panel 10 is deviated from the first direction W through the first polarizer 109. An specific angle is maintained between the polarization direction of the second light L2 and the long axis of the plurality of liquid crystal molecules 1031. The liquid crystal layer 103 composed of the liquid crystal molecules 1031 and disposed in the first direction W performs phase delay in the polarization direction of the second light L2 so as to change the polarization direction of the second light L2 and make the polarization direction of the second light L2 be not parallel to the light-transmitting axis of the first polarizer 109. The polarization direction of the second light L2 for phase delay completely passes the second polarizer 110 when the polarization direction of the second polarizer 110 is parallel to the light-transmitting axis of the second polarizer 110. When the polarization direction of the second light L2 for phase delay is not parallel to the light-transmitting axis of the second polarizer 110 and the light-transmitting axis of the first polarizer 109, part of the second light L2 passes the second polarizer 110. Generally speaking, when the propagation direction of the light emitting into the display panel 10 is parallel to the first direction W, the light is intercepted by the second polarizer 110; when the propagation direction of the light emitting into the display panel 10 deviates from the first direction W, the light passes the second polarizer 110 partially or completely; when the light emitting into the display panel 10 deviates from the first direction W, the light passes the second polarizer 110 partially but more. Correspondingly, the brightness of the display device 100 is the least from the first direction W, and the brightness of the display device 100 gradually increments from near the display panel 10 to away from the display panel 10 in the first direction W. When the display panel 10 is in the first display mode, voltage is not applied to the third electrode layer 106; in other words, voltage applied to the third electrode layer 106 is zero.

Figure 5:
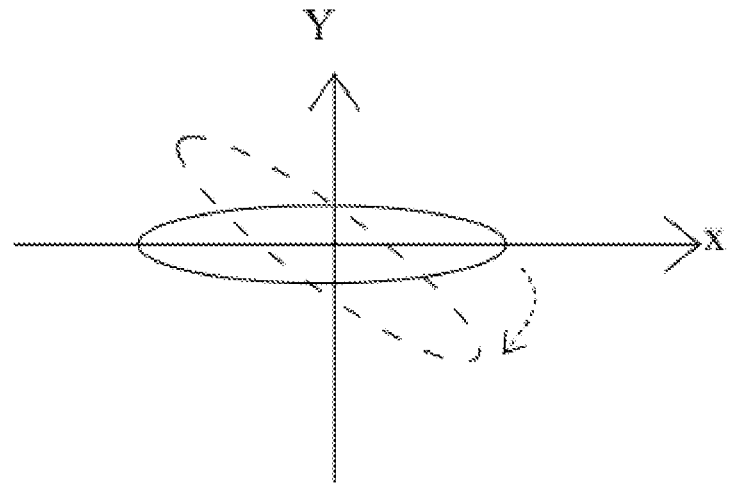
FIG. 5 is a schematic diagram of the liquid crystal molecules rotating in a plane perpendicular to the thickness direction of the display panel when the display panel is in the second display mode in FIG. 3.

When the display device 100 is in the sharing mode and the display panel 10 is in the second display mode, voltage applied to the third electrode layer 106 is greater than the predetermined threshold voltage. The third electrode layer 106, the first electrode layer 104, and the plurality of second electrodes 105 form a sufficiently large vertical electric field. All of the plurality of liquid crystal molecules are negative liquid crystal molecules so the sufficiently large vertical electric field can cause the plurality of liquid crystal molecules 1031 to be toppled over and then to be deviated and rotated from the slanted plane S to a plane perpendicular to the thickness direction of the display panel. Afterwards, the long axis of the plurality of rotated liquid crystal molecules 1031 are in the horizontal plane, and the long axis of the plurality of liquid crystal molecules 1031 is perpendicular to the thickness direction of the display panel 10. The curved electric field formed between the first electrode layer 104 and the plurality of second electrodes 105 rotates the plurality of liquid crystal molecules 1031 in the plane (i.e., the horizontal plane) perpendicular to the thickness direction of the display panel 10 for displaying images, as illustrated in FIG. 5. Because the long axis of the plurality of liquid crystal molecules 1031 is in the horizontal direction, the liquid crystal layer 103 is for phase delay in the polarization direction of the light vertically or slantingly emitting into the display panel 10. Part or more of the light emitting into the display panel 10 can pass the second polarizer 110. The content displayed on the display panel 10 can be known and reached from different viewing angles. Specifically, high voltages are applied to the third electrode layer 106 when the display panel 10 is in the second display mode.

Figure 2:
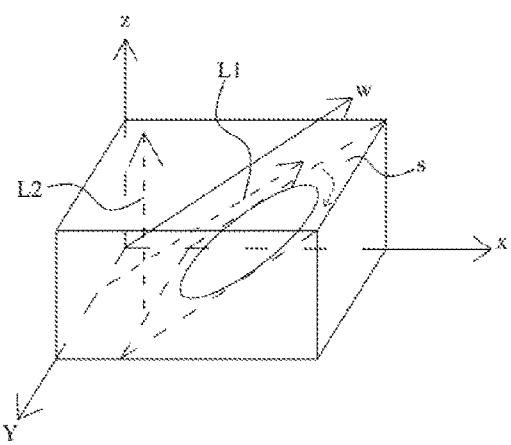
FIG. 2 is a first schematic diagram of the liquid crystal molecules rotating in a slanted plane when the display panel is in the first display mode in FIG. 1.

With reference to FIG. 1 and FIG. 2, a side in the first direction W toward the display panel 10 is defined as a first side of the display panel 10, and the first side is a right side. A second side of the display panel 10 is opposed to the first side of the display panel 10; that is, the second side of the display panel 10 is the left side of the display panel 10. The second side of the display panel 10 and the second side of the display panel 10 are arranged in the opposite sides of the display panel 10. The right side of the display panel 10 and the right side of paper surface are defined as the same side. When the display panel 10 is in the first display mode and is viewed from the right side of the display panel 10 at a partial viewing angle, the display content on the display device 100 can be reached and known from the left side of the display panel due to the low and invisible brightness of the display device 100. Therefore, the visible viewing angle of the first side of the display panel 10 is less than the visible viewing angle of the second side of the display panel 10. When the display panel 10 is in the second display mode, the content on display can be seen on the left and right sides of the display panel 10. The visible viewing angle of the first side of the display panel 10 is the same as the visible viewing angle of the second side of the display panel 10. Especially, the direction of the first side of the display panel 10 pointing to the second side of the display panel 10 is parallel to the X direction and is perpendicular to the second direction Y. The direction of the first side of the display panel 10 pointing to the second side of the display panel 10 is perpendicular to the thickness direction of the display panel 10.

Figure 3:
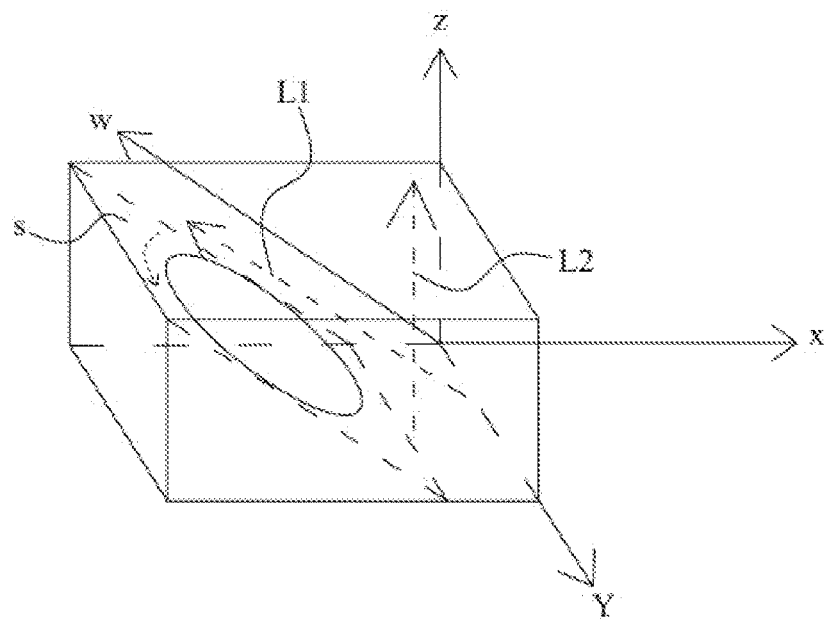
FIG. 3 is a second schematic diagram of the liquid crystal molecules rotating in a slanted plane when the display panel is in the first display mode in FIG. 1.
Figure 4:
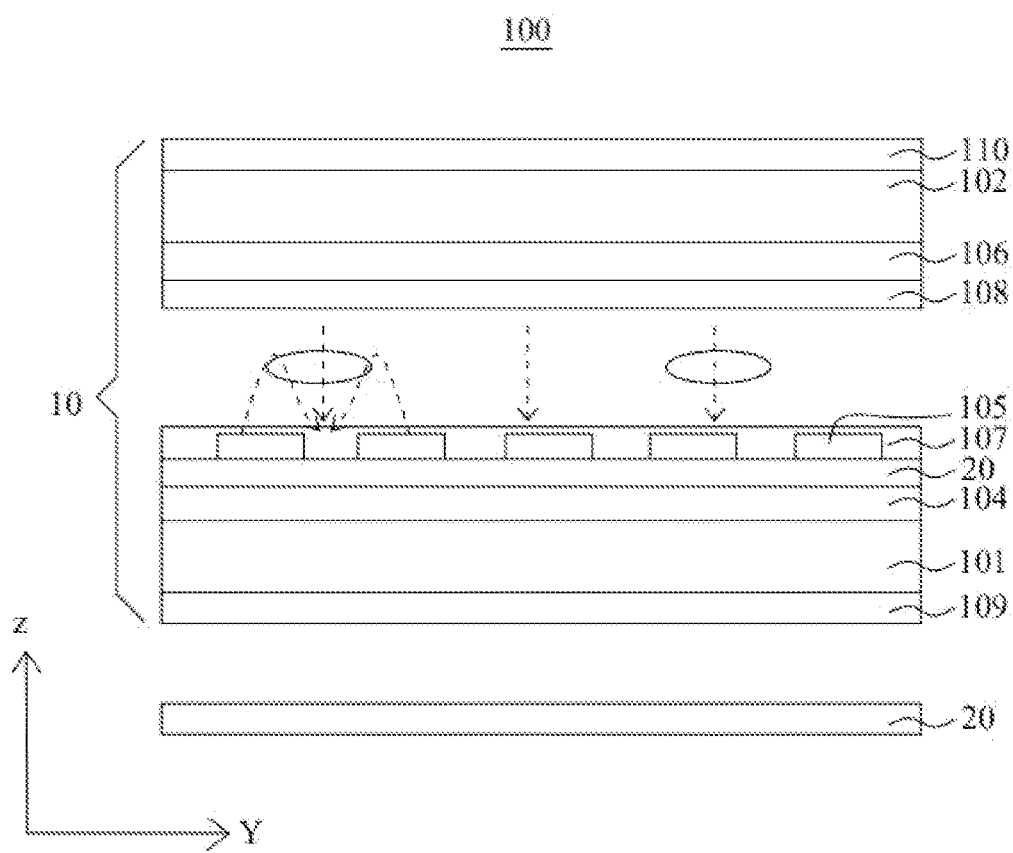
FIG. 4 is a cross-sectional view showing a display device when the display panel is in the second display mode in the present embodiment.

With reference to FIG. 3, the first direction W can head toward the left side of the display panel 10 as well. The left side of the display panel 10 is defined to be the same side as the left side of paper surface. The display device 100 in the first display mode is invisible due to low brightness when being viewed from a partial view of the left side of the display panel 10, but the content displayed on the display device 10 can be reached from the right side of the display panel 10 in the first display mode. Moreover, the content displayed on the display device 10 can be reached from the right and left sides of the display panel 10 in the second display mode.

It is understood that the unidirectional switching from and to the anti-peep mode and the sharing mode is realized on the display device when the display panel in the first display mode is switched from and to the display panel in the second display mode.

The angle between the first direction W and the thickness direction of the display panel 10 is defined to be greater than or equal to 20 degrees and less than or equal to 80 degrees so that a suitable anti-peep angle is provided to the display device in the present embodiment. For example, the angle may be 25 degrees, 30 degrees, 35 degrees, 40 degrees, 42 degrees, 45 degrees, 48 degrees, 50 degrees, 52 degrees, 53 degrees, 55 degrees, 60 degrees, 62 degrees, 64 degrees, 66 degrees, 68 degrees, 70 degrees, 72 degrees, 74 degrees, 76 degrees, and 78 degrees.

Further, the angle between the first direction W and the thickness direction of the display panel 10 is defined to be greater than or equal to 40 degrees and less than or equal to 60 degrees so that a demand of the vehicle display in the direction of 45 degrees from a deviated front view less than two percent (2%).

For the display device proposed by the present embodiment, voltage applied to the third electrode layer is adjusted so that the display panel can dynamically switched from and to the first display mode and the second display mode and the display device can dynamically switched from and to the anti-peep mode and sharing mode. In addition, compared with the display device of the related art that an anti-peep film or a dimming device is a requirement, the display device proposed by the present embodiment implements a unidirectional anti-peep, which satisfies the privacy protection range required by the vehicle user and thins the thickness of the display device. Moreover, the pixel aperture rate for the display panel is not sacrificed definitely so the resolution for the display pane proposed by the present embodiment is improved. Voltage is not imposed on the third electrode layer in the anti-peep mode necessarily, which is conducive to reducing the power consumption of the display device.

Figure 6:
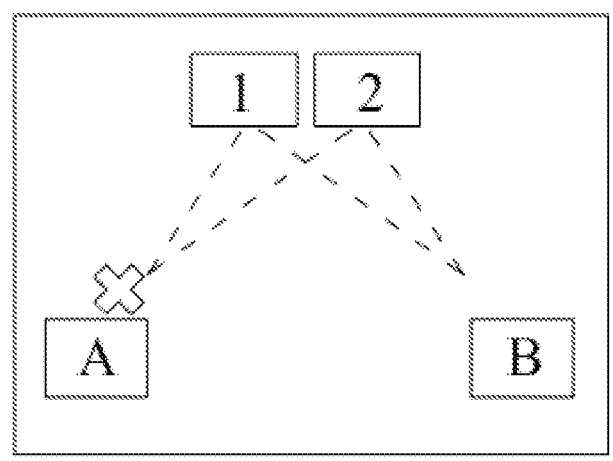
FIG. 6 is a schematic view showing an application scenario of the display device as shown in FIG. 1 which is applied to a vehicle.

With reference to FIG. 6, FIG. 6 is a schematic view showing an application scenario of the display device as shown in FIG. 1 which is applied to a vehicle. The vehicle includes a display device 1, a display device 2, a driver's seat A, and a passenger's seat B. The display device 1 and the display device 2 are arranged between the driver's seat A and the passenger's seat B. The display device 1 is close to the driver's seat A, and the display device 2 is close to the passenger's seat B. The display device 1 is a central control display, and the display device 2 is a passenger's screen. Each of the display device 1 and the display device 2 is the display device 100 as introduced above. In other words, the display device 1 and the display device 2 can achieve switching from and to the sharing mode and the anti-peep mode unidirectionally.

When the display device 1 and the display device 2 are displayed, the display device 1 and the display device 2 can switch from and to the sharing mode and the anti-peep mode for a person sitting in the driver's seat A, and the display device 1 and the display device 2 are always in the sharing mode for another person sitting in the passenger's seat B.

For example, when entertainment information is displayed on the display device 1 and the display device 2, every piece of entertainment information is displayed on the display device 1 and the display device 2 is received by a person sitting on the passenger's seat B while all of the entertainment information displayed on the display device 1 and the display device 2 is not received by another person sitting on the driver's seat A. So the person sitting on the driver's seat A does not disturbed by the entertainment information. When the driving related information is displayed on the display device 1 and the display device 2, each piece of the driving related information displayed on the display device 1 and the display device 2 is received by the people sitting on the driver's seat A and the passenger's seat B.

When information is displayed on the display device 1 and the display device 2, the display device 1 keeps in the sharing mode and the display device 2 switches from and to the sharing mode and the anti-peep mode for the person sitting on the driver's seat A. When information is displayed on the display device 1 and the display device 2, the display device 2 keeps in the sharing mode and the display device 1 switches from and to the sharing mode and anti-peep mode for the person sitting on the passenger's seat B.

In summary, although the present disclosure has been disclosed as above with the preferred embodiments, the above-mentioned preferred embodiments are not intended to limit the application. For all of ordinary skill in the art, various changes and modifications can be made without departing from the spirit and scope of the present disclosure. Therefore, the protection scope of the present disclosure is subject to the scope defined by the claims.

What is claimed is:

1. A display panel, comprising:
    a first substrate;
    a second substrate, disposed opposite to the first substrate;
    a liquid crystal layer, disposed between the first substrate and the second substrate, and comprising a plurality of liquid crystal molecules;
    a first polarizer, disposed at a side of the first substrate away from the second substrate;
    a second polarizer, disposed at a side of the second substrate away from the first substrate; the light-transmitting axis of the first polarizer being perpendicular to the light-transmitting axis of the second polarizer;
    a first electrode layer, totally disposed on a surface of the first substrate close to the second substrate;
    a plurality of second electrodes, disposed at intervals on the first substrate in the second direction; and
    a third electrode layer, disposed on a surface of the second substrate close to the first substrate;
    wherein when the display panel is in a first display mode, the plurality of liquid crystal molecules rotate in a slanted plane, the slanted plane is parallel to a first direction and a second direction, the first direction is slanted with respect to a thickness direction of the display panel, and the second direction is perpendicular to the thickness direction of the display panel and the first direction;
    when the display panel is in the first display mode, voltage applied to the third electrode layer being less than or equal to predetermined threshold voltage, and the electric field formed between the first electrode layer and the plurality of the second electrodes being configured to rotate the plurality of the liquid crystal molecules within the slanted plane;
    when the display device is in the second display mode, voltage applied to the third electrode layer being greater than the predetermined threshold voltage, a vertical electric field formed by the third electrode layer, the first electrode layer, and the plurality of second electrodes being configured to deflect the plurality of the liquid crystal molecules in from the slanted plane to a plane perpendicular to the thickness direction of the display panel, and a curved electric field formed by the first electrode layer and the plurality of second electrodes rotates the plurality of the liquid crystal molecules in the plane perpendicular to the thickness direction of the display panel.

2. The display panel according to claim 1, wherein the plurality of liquid crystal molecules rotate in a plane perpendicular to the thickness direction of the display panel when the display panel is in a second display mode.

3. The display panel according to claim 1, wherein the first electrode layer is disposed between the plurality of the second electrodes and the first substrate in the thickness direction of the display panel.

4. The display panel according to claim 1, wherein an angle between the first direction and the thickness direction of the display panel is defined to be greater than or equal to 20 degrees and less than or equal to 80 degrees.

5. The display panel according to claim 4, wherein an angle between the first direction and the thickness direction of the display panel is defined to be greater than or equal to 40 degrees and less than or equal to 60 degrees.

6. The display panel according to claim 1, further comprising:
a first alignment layer, disposed on a surface of the first substrate close to the second substrate; and
a second alignment layer, disposed on a surface of the second substrate close to the first substrate;
the liquid crystal layer being disposed between the first alignment layer and the second alignment layer; a pretilt angle of the plurality of liquid crystal molecules on the first alignment layer and the second alignment layer being equal to an angle between the first direction and a horizontal direction.

7. The display panel according to claim 1, wherein the plurality of the liquid crystal molecules are negative liquid crystal molecules.

8. A display device, comprising:
a backlight module; and
a display panel, comprising:
a first substrate;
a second substrate, disposed opposite to the first substrate;
a liquid crystal layer, disposed between the first substrate and the second substrate, and comprising a plurality of liquid crystal molecules;
a first polarizer, disposed at a side of the first substrate away from the second substrate;
a second polarizer, disposed at a side of the second substrate away from the first substrate; the light-transmitting axis of the first polarizer being perpendicular to the light-transmitting axis of the second polarizer;
a first electrode layer, totally disposed on a surface of the first substrate close to the second substrate;
a plurality of second electrodes, disposed at intervals on the first substrate in the second direction; and
a third electrode layer, disposed on a surface of the second substrate close to the first substrate;
wherein when the display panel is in a first display mode, the plurality of liquid crystal molecules rotate in a slanted plane, the slanted plane is parallel to a first direction and a second direction, the first direction is slanted with respect to a thickness direction of the display panel, and the second direction is perpendicular to the thickness direction of the display panel and the first direction;
when the display panel is in the first display mode, voltage applied to the third electrode layer being less than or equal to predetermined threshold voltage, and the electric field formed between the first electrode layer and the plurality of the second electrodes being configured to rotate the plurality of the liquid crystal molecules within the slanted plane;
when the display device is in the second display mode, voltage applied to the third electrode layer being greater than the predetermined threshold voltage, a vertical electric field formed by the third electrode layer, the first electrode layer, and the plurality of second electrodes being configured to deflect the plurality of the liquid crystal molecules in from the slanted plane to a plane perpendicular to the thickness direction of the display panel, and a curved electric field formed by the first electrode layer and the plurality of second electrodes rotates the plurality of the liquid crystal molecules in the plane perpendicular to the thickness direction of the display panel.

9. The display device according to claim 8, wherein the plurality of liquid crystal molecules rotate in a plane perpendicular to the thickness direction of the display panel when the display panel is in a second display mode.

10. The display device according to claim 8, wherein the first electrode layer is disposed between the plurality of the second electrodes and the first substrate in the thickness direction of the display panel.

11. The display device according to claim 8, wherein an angle between the first direction and the thickness direction of the display panel is defined to be greater than or equal to 20 degrees and less than or equal to 80 degrees.

12. The display device according to claim 11, wherein an angle between the first direction and the thickness direction of the display panel is defined to be greater than or equal to 40 degrees and less than or equal to 60 degrees.

13. The display device according to claim 8, wherein the display panel further comprises:
a first alignment layer, disposed on a surface of the first substrate close to the second substrate; and
a second alignment layer, disposed on a surface of the second substrate close to the first substrate;
the liquid crystal layer being disposed between the first alignment layer and the second alignment layer; a pretilt angle of the plurality of liquid crystal molecules on the first alignment layer and the second alignment layer being equal to an angle between the first direction and a horizontal direction.

14. The display device according to claim 8, wherein the plurality of the liquid crystal molecules are negative liquid crystal molecules.

15. The display device according to claim 8, wherein the display device is configured to switch from and to anti-peep mode and visible mode.

16. A display panel having a first side and a second side disposed opposite, the display panel comprising:
a first substrate;
a second substrate, disposed opposite to the first substrate;
a first alignment layer, disposed on a surface of the first substrate near the second substrate;
a second alignment layer, disposed on a surface of the second substrate away from the first substrate;
a liquid crystal layer, disposed between the first alignment layer and the second alignment layer, and comprising a plurality of liquid crystal molecules;

a first polarizer, disposed at a side of the first substrate away from the second substrate; and a second polarizer, disposed at a side of the second substrate away from the first substrate, wherein a light-transmitting axis of the second polarizer is perpendicular to a light-transmitting axis of the first polarizer;

when the display panel is in a non-operating state, the first alignment layer and the second alignment layer being configured to slant a long axis of the plurality of the liquid crystal molecules toward the first side;

when the display panel is in first display mode, the long axis of the plurality of the liquid crystal molecules slanting toward the first side, and a visible viewing angle of the first side of the display panel is smaller than a visible viewing angle of the second side of the display panel.

17. The display panel according to claim 16, wherein the display panel further comprises:

a first electrode layer, disposed on a surface of the first substrate close to the second substrate;

a plurality of second electrodes, disposed at intervals on the first substrate; a plurality of the second electrodes being disposed in a second direction; the second direction being perpendicular to a direction of the first side pointing to the second side; the second direction being perpendicular to a thickness direction of the display panel;

a third electrode layer, disposed on a surface of the second substrate close to the first substrate;

when the display panel is in first display mode, no voltage being applied to the third electrode layer, and voltage being applied to the first electrode layer and the plurality of second electrodes.

18. The display panel according to claim 16, wherein when the display panel is in second display mode, the long axis of the plurality of the liquid crystal molecules is perpendicular to a thickness direction of the display panel.

* * * * *